United States Patent [19]

Kadash et al.

[11] Patent Number: 4,714,658
[45] Date of Patent: Dec. 22, 1987

[54] METHOD FOR TREATING POLYMER SURFACES BY CORONA DISCHARGE AND THEN WITH REDUCING AGENT AND RESULTING ARTICLE

[75] Inventors: Marjory A. Kadash, Roswell, Ga.; Frederick C. Schwab, Metuchen, N.J.

[73] Assignee: Mobil Oil Corporation, New York, N.Y.

[21] Appl. No.: 814,715

[22] Filed: Dec. 30, 1985

[51] Int. Cl.$^4$ ............................................. B32B 27/32
[52] U.S. Cl. ...................................... 428/523; 427/40; 427/41; 427/322; 428/411.1; 428/480
[58] Field of Search .......................... 427/40, 41, 322; 428/523, 411.1, 480

[56] References Cited

U.S. PATENT DOCUMENTS 4,468,412  8/1984  Fujii et al. ............................ 427/40

Primary Examiner—Bernard D. Pianalto
Attorney, Agent, or Firm—Alexander J. McKillop; Michael G. Gilman; Edward J. Trojnar

[57] ABSTRACT

Polymer surfaces such as polyethylene or polypropylene films are corona discharge treated in the conventional manner, and then treated with a reducing agent such as aqueous KI to convert the surface functional groups containing oxygen to predominantly hydroxyl groups.

18 Claims, No Drawings

METHOD FOR TREATING POLYMER SURFACES BY CORONA DISCHARGE AND THEN WITH REDUCING AGENT AND RESULTING ARTICLE

BACKGROUND OF THE INVENTION

Polymer surfaces such as the surfaces of polyethylene and polypropylene films are conventionally treated by corona discharge to enhance their printability and to increase the adhesion of inks or other coatings. It is believed that corona discharge results in surface oxidation resulting in a variety of oxygen containing groups, a large portion of which are hydroperoxy groups. Without further treatment, the hydroperoxy groups react further to give a surface containing hydroxyl, carbonyl, and carboxyl groups.

In accordance with this invention, the corona discharge treated film is immediately treated with a reducing agent to convert the hydroperoxy groups to hydroxy groups.

SUMMARY OF THE INVENTION

Polymer surfaces are corona discharge treated in the conventional manner and then immediately treated with a reducing agent which converts the hydroperoxy groups formed in corona discharge to hydroxyl groups. The hydroxyl groups can then be reacted with other reagents to chemically bond desirable functional moieties to the surface.

DETAILED DESCRIPTION OF THE INVENTION

In accordance with this invention, the conventional corona discharge treatment of a polymer such as polyethylene or polypropylene film is immediately followed by a treatment with a reducing agent. The mechanism proposed for the corona treatment process involves a hydrogen abstraction from the hydocarbon backbone followed by a rapid addition of oxygen to yield the hydroperoxide. From there, the hydroperoxides can decompose, react with more oxygen and produce a variety of oxidation species like alcohols, ethers, ketones, aldehydes, esters and acids (auto oxidation reaction). This variety of oxidation species is typical of a corona treatment.

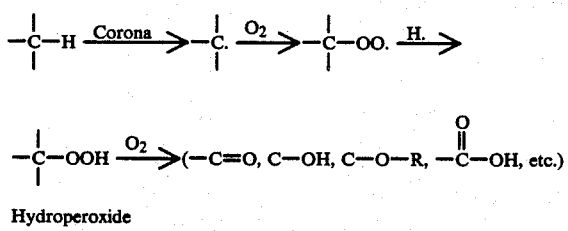

Hydroperoxide

Potassium iodide is a well-known reagent used to reduce hydroperoxides to alcohols. The reducing agent is the iodide ion which is oxidized by the hydroperoxide to iodine via the following reaction:

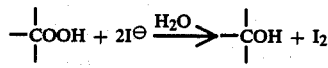

Any water soluble salt capable of yielding an iodide anion can be substituted for KI, e.g., alkali metal iodides (Li, Na, K, Rb, Cs) or alkali earth metals (Mg, Ca, etc.). Other reducing agents include thioethers, ferrous ion and cuprous ion.

Once the alcohol groups are formed, the entire organic chemistry of alcohols becomes available. Examples of typical reactions that can be carried out are:

Hydrogen halides (e.g., HF, HCl, HBr, HI).
Phosphorous trihalides ($PCl_3$, etc.).
Reactive organometalics (e.g. BuLi, $AlCl_3$, $Ti(OR)_4$, etc.).
Reactive metals (Na, Li, K, etc.).
Ester formation (e.g., acetates, formates, etc.).
Controlled oxidation of higher oxidized species (e.g., ketones, aldehydes, acids).
Isocyanates (e.g., toluenediisocyanate).
Ketene.
Alpha-haloacetophenones.
Benzyl halides (e.g., benzylchloride).
Acyl halides (e.g., acetylchloride).

Reaction of a suitable reagent containing functional groups which readily react with the hydroxyl group can be used to chemically bond moeities to the polymer surface which alter the surface in a desirable manner. For example, fatty acid or silicone moeities can be bonded to the surface to impart slip properties without the disadvantage of migration of the slip agent. Similarly, the film can be treated with an acryloyl or methacryloyl-halide to bond the acrylic or methacrylic moeity which is capable of reacting with UV cured inks, coatings and the like. The polymer surface can also be treated with polyisocyanates which promote adhesion of films or coatings such as polyamides.

A variety of polymers can be treated in accordance with this invention including all polymers which are conventionally treated with corona discharge treatment to alter their surface characteristics. Included are polyolefins such as polypropylene, polyethylene homopolymers and polyethylene copolymers, and polyesters.

The invention is suitable for treatment of polymer articles of all kinds but particularly films or articles made from films. The articles can be treated over their entire surface or only in selected areas, for example the areas which are to be subsequently coated or printed.

The treatment to accomplish reduction of the hydroperoxide groups to hydroxy groups can be accomplished by any of the known means. It is advantageous to use a reducing agent which is soluble in water or other inexpensive solvent, and which itself does not have undesirable characteristics such as undue toxicity or the like. As previously mentioned, iodides, particularly potassium iodide, are suitable.

The invention is illustrated by the following non-limiting examples in which parts are by weight unless otherwise stated.

EXAMPLE 1

Polyethylene and polyolefin films were treated in a table top corona discharge unit at typical commercial treatment levels. Samples of each film were immediately quenched in a 6 weight percent solution of potassium iodide for about 10 minutes. The quenched and unquenched samples were analyzed for the relative presence of hydroxy, carbonyl and carboxyl species. The results are shown in the Table.

TABLE I

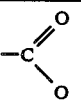

| | Total Surface % Oxygen | Oxygen Species, Relative % | | |
|---|---|---|---|---|
| | | —C—O | —C=O | —C(=O)O |
| Polyethylene | | | | |
| No KI | 15 | 50 | 33 | 17 |
| KI | 9 | 71 | 22 | 7 |
| Polypropylene | | | | |
| No KI | 14 | 59 | 16 | 25 |
| KI | 9 | 68 | 8 | 24 |

The shift in type of oxygen species as a result of the KI treatment (to alcohols) is evident.

The reduction in total surface oxygen with the KI treatment is also evidence that the KI quench converted the hydroperoxide groups to alcohols preventing further oxidation.

EXAMPLE 2

A quantity of 3.6 gms of titanium (di-i-propoxide) bis(2,4,pentane dionate) was dissolved in 1 liter of acetone to give a 0.01 molar solution. This compound is known to react only wih alcohol groups and not with other functional groups like ketones, acids, etc. A polyethylene film, which was previously corona treated, was placed in the solution at room temperature for one hour. The film was then washed three times with fresh acetone and dried at 40° C. ESCA analysis of the surface showed the presence of 4% titanium.

EXAMPLE 3

A piece of polyolefin film, which had previously been corona treated and quenched in KI solution and dried, is placed in a bath containing a 0.1M solution of methacryloylchloride in dry acetone for one hour. After washing and drying, the film surface contains reactive methacrylate groups which can further react with UV cured inks, coatings and the like.

EXAMPLE 4

A polyolefin film treated in the same manner as above (corona/KI) is exposed to a 0.1M solution of erucoylchloride in dry toluene for one hour. After washing and drying, the film will contain a surface coating of erucic acid which is anchored to the surface. This type surface will function as a migrationless slip agent.

EXAMPLE 5

An alternative slip agent would include exposing the surface of the corona/KI treated film to a solution of thionyl chloride in dry toluene (0.1M). The resulting film will contain reactive thionyl chloride groups which can then be reacted with low molecular weight, carbinol terminated siloxanes to give a surface coated with silicone. These silicones will give low coefficient of friction surfaces acting as migrationless slip agents.

EXAMPLE 6

A polyolefin surface like high density polyethylene which has been treated with corona/KI is exposed to a solution of toluene diisocyanate (TDI) in dry toluene (1M) for one hour. After washing and drying, the film is immediately laminated with a nylon film. In this function, the TDI functions as an adhesion promoter for the nylon/polyethylene composite resulting in permanent nylon/polyethylene bonds.

Although the present invention has been described with preferred embodiments, it is to be understood that modifications and variations can be resorted to without departing from the spirit and scope of this invention, as those skilled in the art will readily understand. Such variations and modifications are considered to be within the purview and scope of the appended claims.

I claim:

1. A method of treating polymer articles which are capable of being surface oxidized under corona discharge conditions comprising the steps of:
   (a) subjecting the articles to corona discharge sufficient to introduce surface oxygen containing groups including hydroperoxide groups; and
   (b) immediately thereafter subjecting the article to a treatment with an alkali metal iodide or an alkaline earth metal iodide to convert at least some of said hydroperoxide groups to hydroxyl groups.
2. The method of claim 1 in which said treatment is conducted with potassium iodide.
3. The method of claim 2 in which said polymer is polyethylene or a copolymer of ethylene and a higher olefin.
4. An article prepared by the method of claim 3.
5. The method of claim 2 in which said polymer is polypropylene.
6. An article prepared by the method of claim 5.
7. An article prepared by the method of claim 2.
8. The method of claim 1 in which said polymer is polyethylene or a copolymer of ethylene and a higher olefin.
9. An article prepared by the method of claim 8.
10. The method of claim 1 in which said polymer is polypropylene.
11. An article prepared by the method of claim 10.
12. The method of claim 1 in which said polymer article is a film.
13. An article prepared by the method of claim 12.
14. The method of claim 1 in which said polymer article is further treated with a reagent which is capable of reacting with said hydroxyl groups.
15. An article prepared by the method of claim 14.
16. The method of claim 14 in which said article is a film and reagent capable of reacting with hydroxyl groups is a slip agent.
17. The film produced by the method of claim 16.
18. An article prepared by the method of claim 1.

* * * * *